(12) United States Patent
Engdahl et al.

(10) Patent No.: US 7,647,049 B2
(45) Date of Patent: Jan. 12, 2010

(54) DETECTION OF HIGH VELOCITY MOVEMENT IN A TELECOMMUNICATION SYSTEM

(75) Inventors: Karin Engdahl, Staffanstorp (SE); Lennart Andersson, Hjärnarp (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 727 days.

(21) Appl. No.: 11/456,998

(22) Filed: Jul. 12, 2006

(65) Prior Publication Data

US 2008/0014881 A1  Jan. 17, 2008

(51) Int. Cl.
 *H04Q 7/20* (2006.01)
(52) U.S. Cl. ........... 455/441; 455/426.1; 455/422.1; 342/461; 370/342; 375/344
(58) Field of Classification Search ......... 455/441, 455/426.1, 422.1; 370/342; 375/344; 342/461
See application file for complete search history.

(56) References Cited

U.S. PATENT DOCUMENTS

| 5,513,221 | A | * | 4/1996 | Parr et al. .............. 375/344 |
| 5,585,805 | A | * | 12/1996 | Takenaka et al. ........... 342/461 |
| 5,604,503 | A | | 2/1997 | Fowler et al. |
| 6,081,702 | A | | 6/2000 | Serfaty et al. |
| 6,429,804 | B1 | * | 8/2002 | Kishida et al. ............. 342/70 |
| 6,529,850 | B2 | | 3/2003 | Wilborn et al. |
| 6,603,819 | B1 | | 8/2003 | Myers |
| 6,850,505 | B1 | | 2/2005 | Ostberg |
| 2004/0264297 | A1 | * | 12/2004 | Berkman et al. ............. 367/99 |
| 2005/0059356 | A1 | * | 3/2005 | Lee et al. ................. 455/67.16 |
| 2005/0265470 | A1 | * | 12/2005 | Kishigami et al. .......... 375/267 |
| 2006/0039318 | A1 | * | 2/2006 | Oh et al. ..................... 370/328 |

FOREIGN PATENT DOCUMENTS

| CA | 2056914 A1 | 6/1992 |
| EP | 1 416 692 A | 5/2004 |
| EP | 1 416 692 A2 | 5/2004 |
| EP | 1 469 685 A1 | 10/2004 |

(Continued)

OTHER PUBLICATIONS

Oh, Hyuk Jun et al., "An adaptive channel estimation scheme for DS-CDMA systems" IEEE Vehicular Technology Conference, vol. 6, Sep. 24, 2000, pp. 2839-2843, Piscataway, US, XP010525099.

(Continued)

*Primary Examiner*—Danh C Le
(74) *Attorney, Agent, or Firm*—Potomac Patent Group PLLC

(57) ABSTRACT

Whether relative velocity between a transmitter and a receiver is higher than a predetermined amount is detected. This involves using a Doppler estimation technique to generate an estimate of Doppler spread, $\hat{f}_D^{(1)}$, based on a received signal, and using an alternative velocity estimation technique to generate an estimate of velocity, $\hat{v}$, based on the received signal, wherein the alternative velocity estimation technique differs from the Doppler estimation technique. A plurality of estimates, including at least the estimate of Doppler spread and the estimate of velocity, are used to detect whether the relative velocity between the transmitter and the receiver is higher than the predetermined amount. The alternative velocity estimation technique may, for example, be a second Doppler estimation technique that differs from the other Doppler estimation technique.

34 Claims, 12 Drawing Sheets

FOREIGN PATENT DOCUMENTS

| | | | |
|---|---|---|---|
| EP | 1 511 186 A | 3/2005 | |
| EP | 1 511 186 A1 | 3/2005 | |
| EP | 1 603 360 A1 | 12/2005 | |
| JP | 2000-171558 | 6/2000 | |
| JP | 2001/298395 A | 10/2001 | |
| JP | 2001-298395 A | 10/2001 | |
| WO | 03/036813 A | 5/2003 | |
| WO | 2004/048998 A1 | 6/2004 | |

OTHER PUBLICATIONS

Chien, Charles et al., "Adaptive Radio for Multimedia Wireless Links" IEEE Journal on Selected Areas in Communications, vol. 17, No. 5, May 1999, pp. 793-813, Piscataway, US, XP011054951.

Mohanty, Shantidev et al., "An accurate velocity estimation algorithm for resource management in next generation wireless systems" IEEE Conference on Decision and Control, vol. 3, Dec. 14, 2004, pp. 2848-2853, Piscataway, US, XP010794300.

European Search Report, completed Jan. 31, 2007, in connection with U.S. Appl. No. 11/456,998.

Baddour, K.E. et al., "Robust Doppler Spread Estimation in Nonisotropic Scattering Environments," IEEE Vehicular Technology Conference-Fall, (VTC-Fall 2002), Vancouver, Canada, Sep. 24-28, 2002, pp. 2459-2464.

Tepedelenlioglu, C. et al., "Estimation of Doppler Spread and Signal Strength in Mobile Communications with Applications to Handoff and Adaptive Transmission," Wireless Communications and Mobile Computing, vol. 1, No. 2, Mar. 2001, pp. 221-242.

* cited by examiner

US 7,647,049 B2

DETECTION OF HIGH VELOCITY MOVEMENT IN A TELECOMMUNICATION SYSTEM

BACKGROUND

The present invention relates to mobile telecommunication systems, and more particularly to methods and apparatuses that determine high velocity relative movement between a transmitter and a receiver in a telecommunication system.

Digital communication systems include time-division multiple access (TDMA) systems, such as cellular radio telephone systems that comply with the GSM telecommunication standard and its enhancements like GSM/EDGE, and Code-Division Multiple Access (CDMA) systems, such as cellular radio telephone systems that comply with the IS-95, cdma2000, and Wideband CDMA (WCDMA) telecommunication standards. Digital communication systems also include "blended" TDMA and CDMA systems, such as cellular radio telephone systems that comply with the Universal Mobile Telecommunications System (UMTS) standard, which specifies a third generation (3G) mobile system being developed by the European Telecommunications Standards Institute (ETSI) within the International Telecommunication Union's (ITU's) IMT-2000 framework. The Third Generation Partnership Project (3GPP) promulgates the UMTS standard. This application focuses on WCDMA systems for economy of explanation, but it will be understood that the principles described in this application can be implemented in other digital communication systems.

WCDMA is based on direct-sequence spread-spectrum techniques, with pseudo-noise scrambling codes and orthogonal channelization codes separating base stations and physical channels (user equipment or users), respectively, in the downlink (base-to-user equipment) direction. User Equipment (UE) communicates with the system through, for example, respective dedicated physical channels (DPCHs). WCDMA terminology is used here, but it will be appreciated that other systems have corresponding terminology. Scrambling and channelization codes and transmit power control are well known in the art.

FIG. 1 depicts a mobile radio cellular telecommunication system 100, which may be, for example, a CDMA or a WCDMA communication system. Radio network controllers (RNCs) 112, 114 control various radio network functions including for example radio access bearer setup, diversity handover, and the like. More generally, each RNC directs UE calls via the appropriate base station(s) (BSs). The UE and BS communicate with each other through downlink (i.e., base-to-UE or forward) and uplink (i.e., UE-to-base or reverse) channels. RNC 112 is shown coupled to BSs 116, 118, 120, and RNC 114 is shown coupled to BSs 122, 124, 126. Each BS serves a geographical area that can be divided into one or more cell(s). BS 126 is shown as having five antenna sectors S1-S5, which can be said to make up the cell of the BS 126. The BSs are coupled to their corresponding RNCs by dedicated telephone lines, optical fiber links, microwave links, and the like. Both RNCs 112, 114 are connected with external networks such as the public switched telephone network (PSTN), the Internet, and the like through one or more core network nodes like a mobile switching center (not shown) and/or a packet radio service node (not shown). In FIG. 1, UE 128 is shown communicating with BS 118. UE 130 is shown communicating with plural base stations, namely BSs 120 and 122. A control link between RNCs 112, 114 permits diversity communications to/from UE 130 via BSs 120, 122.

At the UE, the modulated carrier signal (Layer 1) is processed to produce an estimate of the original information data stream intended for the receiver. The composite received baseband spread signal is commonly provided to a RAKE processor that includes a number of "fingers", or de-spreaders, that are each assigned to respective ones of selected components, such as multipath echoes or streams from different base stations, in the received signal. Each finger combines a received component with the scrambling sequence and the appropriate channelization code so as to de-spread a component of the received composite signal. The RAKE processor typically de-spreads both sent information data and pilot or training symbols that are included in the composite signal.

In a typical wireless communication system, each device (e.g. UE, BS) has its own local oscillator which defines a time reference. It is crucial that the local oscillators of devices communicating with each other be aligned as precisely as possible, otherwise their time references will drift in relation to each other. This drift could lead to the devices no longer being capable of receiving information properly from each other, which in turn causes degraded receiver performance. Ultimately, the connection may be lost due to loss of synchronization between the UE and BS.

This applies in particular to wireless telecommunication systems such as WCDMA. In such systems, the UE applies an automatic frequency control (AFC) mechanism to adjust its local oscillator in a manner that keeps it well aligned with the local oscillators of the base station(s) it is connected to.

Typical operation of the AFC comprises analyzing a characteristic (e.g., complex channel estimates) over time, and attempting to adjust the local oscillator such that no rotation of the channel estimates are detected in the complex plane. This algorithm is based on the fact that rotation corresponds to relative frequency drift, which in turn corresponds to relative time reference drift.

FIG. 2 is a block diagram of the parts of a UE involved in AFC operation. Of particular relevance to this discussion is the local oscillator (VCXO) 201 which generates the frequencies necessary for operating the Front End Receiver (RX Fe) 203 and Front End Transmitter (not shown) sections. An AFC 205 generates a digital control signal ($f_{err}$) that, after conversion to an analog control voltage by a Digital-to-Analog Converter (DAC) 207 adjusts the output frequency of the local oscillator 201.

The AFC 205 may be selectively operated in one of a plurality of different speed modes. The speed mode may be set by a Doppler estimator 209.

Consider an example in which there are two different speed modes. In an exemplary low speed mode, one channel estimate per finger is collected in each slot, and in an exemplary high speed mode five channel estimates per finger are collected in each slot. The value $$y = \sum_f \hat{h}_f (\hat{h}_f^{(previous)})^* \quad (1)$$

(where "*" denotes complex conjugation) is calculated and then filtered according to $$y_{filt} = \lambda(y - y_{filt}^{(previous)}) + y_{filt}^{(previous)} \quad (2)$$

where λ is a filter parameter, f denotes the fingers involved in AFC operation, and $\hat{h}_f$ and $\hat{h}_f^{(previous)}$ are the current and previous channel estimates, respectively, for finger f, each generated by a channel estimator 211. The filter state is appropriately reset whenever an update of the UE frequency reference ($f_{UE}$) or a speedmode change occurs. The reported frequency error $f_{err}$ is calculated as $$\varphi = \arg(y_{filt}), f_{err} = \frac{\varphi}{2\pi\Delta t}, \qquad (3)$$

where $\Delta t$ is the time interval between two consecutive updates of the AFC (i.e., two consecutive collected channel estimates), for example $1/1500$ seconds in low speed mode and $1/7500$ seconds in high speed mode.

In the arrangement as described above, there is a high risk of AFC wrap-around in certain situations. The wrap-around occurs when $$|\Delta f| > \frac{1}{2\Delta t} \qquad (4)$$

where $\Delta f$ is the frequency error caused by the Doppler shift together with the difference between the BS transmit frequency reference and the UE receive frequency reference, and $\Delta t$ is the time interval between two consecutive updates of the AFC (i.e., two consecutive collected channel estimates). The inequality expressed in Equation (4) corresponds to a situation in which the channel estimates rotate more than $\pm\pi$ between two consecutive channel estimates collected by the AFC, which results in the frequency error $f_{err}$ reported by the AFC being erroneous by a multiple of $$\frac{1}{\Delta t} \text{ Hz.}$$

As an example, a UE can be designed in which the AFC is updated once every slot in low speed mode, whereby $$\frac{1}{2\Delta t} = 750 \text{ Hz.}$$

In an exemplary high speed mode, the UE's AFC can be updated five times every slot, whereby $$\frac{1}{2\Delta t} = 3750 \text{ Hz.}$$

It can be seen that the AFC is substantially more tolerant of frequency errors in high speed mode than in low speed mode. It is noted that in other embodiments that call for a different number of channel estimates per slot, different values of $\Delta t$ are obtained. Further, as mentioned earlier, the number of speed modes may be higher than two.

It should be noted that, in current applications of WCDMA, the UE goes out-of-sync if the correct frequency reference is not restored within approximately 50-150 slots.

A scenario that is especially vulnerable to AFC wrap-around when the UE is moving at high relative velocities (assuming that the AFC is operating in low speed mode) is that in which the UE is passing a base station closely (less than 10 m or so).

In such a scenario, a wrap-around event can occur for relative velocities around and above 185 km/h (i.e., the UE's velocity relative to the base station) for embodiments in which $\Delta t=1/1500$.

FIGS. 3(*a*)-(*c*) through 5(*a*)-(*c*) are graphs depicting exemplary results obtained by simulating the above-described scenario, employing a one-tap line-of-sight (LOS) channel without fading or interference.

In this simulation, the UE is assumed to pass the base station at a distance of 2 m. The UE frequency reference is shown without the carrier frequency component. The same settings apply to all simulations shown in this specification.

FIGS. 3*a-c* are graphs depicting the tracking ability of the AFC 205 when it remains in a low speed mode (speedmode equals zero, meaning low speed mode, for all slots as depicted in the graph of FIG. 3*c*) at a relative velocity of 150 km/h. FIG. 3*a* allows a comparison to be made between the true Doppler shift (graph 301) and the shift in the UE frequency (graph 303). FIG. 3*b* allows a comparison to be made between the true frequency error (graph 305) and the reported frequency error (graph 307) generated by the AFC 205. It can be seen that, at this relative velocity, the UE is able to follow the Doppler shift caused frequency change even when the AFC update rate is low.

FIGS. 4*a-c* are graphs depicting the tracking ability of the AFC 205 when it remains in a low speed mode (speedmode equals zero, meaning low speed mode, for all slots as depicted in the graph of FIG. 4*c*) but the relative velocity increases to 350 km/h. FIG. 4*a* allows a comparison to be made between the true Doppler shift (graph 401) and the shift in the UE frequency (graph 403). FIG. 4*b* allows a comparison to be made between the true frequency error (graph 405) and the reported frequency error (graph 407) generated by the AFC 205. As can be seen, at this relative velocity the AFC 205 is incapable of tracking the Doppler shift caused frequency change when it is updated at the low rate.

FIGS. 5*a-c* are graphs depicting the tracking ability of the AFC 205 when it operates at a high speed mode (speedmode equals one, meaning high speed mode, for all slots as depicted in the graph of FIG. 5*c*) and the relative velocity is 350 km/h. FIG. 5*a* allows a comparison to be made between the true Doppler shift (graph 501) and the shift in the UE frequency (graph 503). FIG. 5*b* allows a comparison to be made between the true frequency error (graph 505) and the reported frequency error (graph 507) generated by the AFC 205. As can be seen, even at this relative velocity the AFC 205 is able to track the Doppler shift caused frequency change when it is updated at the high rate.

In an exemplary UE, wrap-around occurs when $\Delta f > 3750$ Hz if the AFC 205 is operating in high speed mode. Hence, wrap-around would occur around and above 935 km/h for the above-described scenario. This indicates that if the AFC were in high speed mode at the proper moments in time, the wrap-around problem would be resolved for all currently realistic velocities. However, it may be undesirable to run the AFC in high speed modes at all times because the AFC may become more sensitive to noise, which can result in unnecessary toggling in UE frequency compensations in high speed mode. This is one reason why a Doppler estimator 209 is employed in the exemplary UE shown in FIG. 2: The Doppler estimator 209 determines the state of speedmode, which in turn governs whether the AFC update rate will be high or low. (The Doppler estimator 209 also may be used for other purposes in the receiver chain, such as setting parameters for, e.g., filters for channel estimation, SIR estimation, and the like; and turning on and off algorithms, e.g., GRAKE in low speed mode and RAKE in high speed mode.) Different Doppler estimation algorithms can be considered for this purpose, such as the level crossing algorithm and the argument (or zero) crossing algorithm. As will be explained, however, both of these algorithms have problems with detecting high speed situations under line-of-sight (LOS) conditions, since the algorithms measure fading properties (which are related to the Doppler spread) and not velocity itself. A Doppler estimate is related to the fading characteristics of the channel, and is assumed to be approximately proportional to the relative velocity of the device, which is true for Rayleigh fading channels, but not at all for channels with little (e.g., Ricean) or no fading (e.g., Additive White Gaussian Noise, or "AWGN").

The level crossing algorithm counts the number of times the absolute value of, for example, the complex channel estimate or an estimated signal-to-interference ratio (SIR) value crosses a given level, and converts the number of registered level crossings into a Doppler estimate.

The level crossing algorithm is based on the assumption that the higher the relative velocity is, the faster the fading is, and hence the number of level crossings per time unit should correspond to the relative velocity. This is a quite accurate method as long as the paths involved are all Rayleigh distributed. However, in LOS conditions, the strongest path is typically very dominant and has a Ricean distribution (hence it can be fading very weakly or hardly at all). Using a level crossing Doppler estimator in such a situation would result in high relative velocity situations not being detected and the AFC remaining in low speed mode.

In one of its variants, the argument crossing algorithm counts the number of times the complex channel estimate crosses any of the imaginary or real axes, and converts the number of registered axes crossings into a Doppler estimate.

The argument crossing algorithm assumes that the phase variations become faster the higher the relative velocity is, and hence the number of crossings per time unit should correspond to the relative velocity. This is also a quite accurate method as long as the paths involved are all Rayleigh fading. In LOS conditions, however, the strongest path typically experiences a rotation due to Doppler shift, and this rotation typically dominates over the random phase variations. Then the argument crossing Doppler estimator will mainly register the rotation due to changes in the Doppler shift. This creates a severe risk of the relative velocity being underestimated, which may result in, for example, the AFC remaining in low speed mode when it should be switching to high speed mode.

Since none of the conventional Doppler estimation algorithms will detect high speed situations in a LOS environment, their use in the Doppler estimator 209 could keep the AFC 205 in low speed mode when it should be in high speed mode, thereby creating a high risk of AFC wrap-around in these situations.

In addition to the above application, Doppler estimation is also used in wireless communication devices (e.g., a UE) to define other operations (e.g., filter constants) for such things as channel estimation, SIR estimation, and the like.

Therefore, there is a need for methods and apparatuses that can detect high speed movement in LOS situations.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that detect whether a relative velocity between a transmitter and a receiver in a cellular telecommunications system is higher than a predetermined amount. In one aspect, this involves using a Doppler estimation technique to generate an estimate of Doppler spread, $\hat{f}_D^{(1)}$, based on a received signal; and using an alternative velocity estimation technique to generate an estimate of velocity, $\hat{v}$, based on the received signal, wherein the alternative velocity estimation technique differs from the Doppler estimation technique. A plurality of estimates are then used to detect whether the relative velocity between the transmitter and the receiver is higher than the predetermined amount, wherein the plurality of estimates includes at least the estimate of Doppler spread and the estimate of velocity.

In some embodiments, the Doppler estimation technique is a first Doppler estimation technique; the estimate of Doppler spread, $\hat{f}_D^{(1)}$, is a first estimate of Doppler spread; the alternative velocity estimation technique is a second Doppler estimation technique that differs from the first Doppler estimation technique; and the estimate of velocity is a second estimate of Doppler spread, $\hat{f}_D^{(2)}$.

In such embodiments, the first Doppler estimation technique comprises utilizing information about a part of the received signal associated with a strongest path between the transmitter and the receiver. Further, the second Doppler estimation technique comprises excluding information about a part of the received signal associated with the strongest path between the transmitter and the receiver; and utilizing information about a part of the received signal associated with a secondary path between the transmitter and the receiver.

In still another aspect, using the plurality of estimates to detect whether a relative velocity between the transmitter and the receiver is higher than the predetermined amount comprises concluding that the relative velocity between the transmitter and the receiver is higher than the predetermined amount if $$(\hat{f}_D^{(1)} > \tau_{high}) \text{OR}((\hat{f}_D^{(2)} > \tau_{high}) \text{AND}(r(\hat{f}_D^{(2)}) > \tau_r)); \text{ and}$$

concluding that the relative velocity between the transmitter and the receiver is lower than the predetermined amount if $$(\hat{f}_D^{(1)} < \tau_{low}) \text{AND}((\hat{f}_D^{(2)} < \tau_{low}) \text{OR}(r(\hat{f}_D^{(2)}) < \tau_r)),$$

wherein $r(\hat{f}_D^{(2)})$ is a parameter indicating the reliability of $\hat{f}_D^{(2)}$, $\tau_{high}$ is a threshold representing a minimum Doppler value associated with a relative velocity between the transmitter and the receiver that is higher than the predetermined amount, $\tau_{low}$ is a threshold representing a maximum Doppler value associated with a relative velocity between the transmitter and the receiver that is lower than the predetermined amount, and $\tau_r$ is a threshold representing a minimum required value of reliability.

In another aspect, detecting whether the relative velocity between a receiver and a transmitter is higher than a predetermined amount involves detecting whether there exists uninterrupted rotation of a channel estimate over a predetermined period of time; and in response to detecting the existence of uninterrupted rotation of the channel estimate over the predetermined period of time, concluding that the relative velocity between the transmitter and the receiver is higher than the predetermined amount.

In still another aspect, in response to detecting that the relative velocity between the transmitter and the receiver is higher than the predetermined amount, an automatic frequency controller is operated at a high update rate. Operation of the automatic frequency controller is changed to a low update rate in response to determining that a magnitude of a frequency error generated by the automatic frequency controller has continuously remained below a predetermined threshold value for a predetermined period of time.

In yet another aspect, detecting whether the relative velocity between a receiver and a transmitter is higher than a predetermined amount involves determining a residual frequency offset value, $f_{err,f}^{(res)}$, f∈F, wherein F represents a set of RAKE receiver fingers involved in automatic frequency control operation; determining a function of the residual frequency offset value, $\zeta(f_{err,f}^{(res)})$; and concluding that the relative velocity between the transmitter and the receiver is higher than the predetermined amount in response to determining that the function of the residual frequency offset value, $\zeta(f_{err,f}^{(res)})$, is greater than a predetermined threshold value.

In another aspect, using the plurality of estimates comprises concluding that the relative velocity between the transmitter and the receiver is not higher than the predetermined amount only if none of the plurality of estimates indicates that the relative velocity between the transmitter and the receiver is higher than the predetermined amount.

In various embodiments, the results of detecting whether the relative velocity between the transmitter and the receiver is higher than the predetermined amount can be used to set receiver parameters, such as automatic frequency control parameters.

The various aspects can be practiced in a user equipment, as well as in, for example, a base station of a telecommunications system. The telecommunication system can be, for example, a Wideband Code Division Multiple Access (WCDMA) telecommunications system.

BRIEF DESCRIPTION OF THE DRAWINGS

The objects and advantages of the invention will be understood by reading the following detailed description in conjunction with the drawings in which.

DETAILED DESCRIPTION

Figure 1:
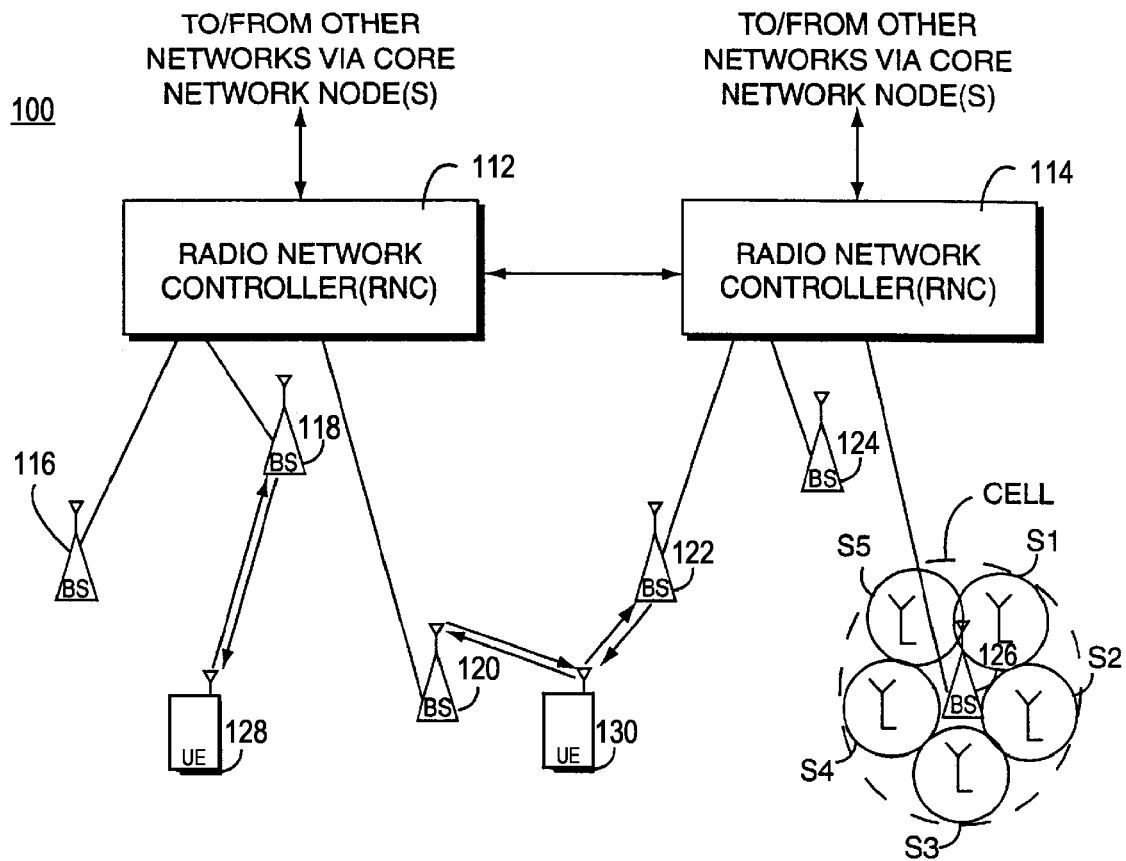
FIG. 1 depicts a mobile radio cellular telecommunication system 100, which may be, for example, a CDMA or a WCDMA communication system.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, optical disk or carrier wave (such as radio frequency, audio frequency or optical frequency carrier waves) containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

In one aspect, higher reliability of relative velocity estimates in LOS conditions is achieved by excluding the strongest path associated with the received signal from the Doppler estimation, since the other paths are more likely to be Rayleigh distributed at all times. The results of such a Doppler estimation can be used alone, but are advantageously combined (e.g., by means of a logical OR) with the results produced by standard Doppler estimation techniques.

Other embodiments are based on the behavior of the channel estimates in a LOS situation with little or no fading of the strongest path. In such a situation, the phase variations have a random superimposed component but, unless the AFC is completely aligned (or off by an amount k/Δt, where k is an integer), there is a deterministic phase rotation that is completely dominating. These other embodiments include detection of such rotation situations, and use this detection as an indicator of a high relative velocity LOS situation, in which there is an elevated risk of AFC wrap-around.

Figure 6A:
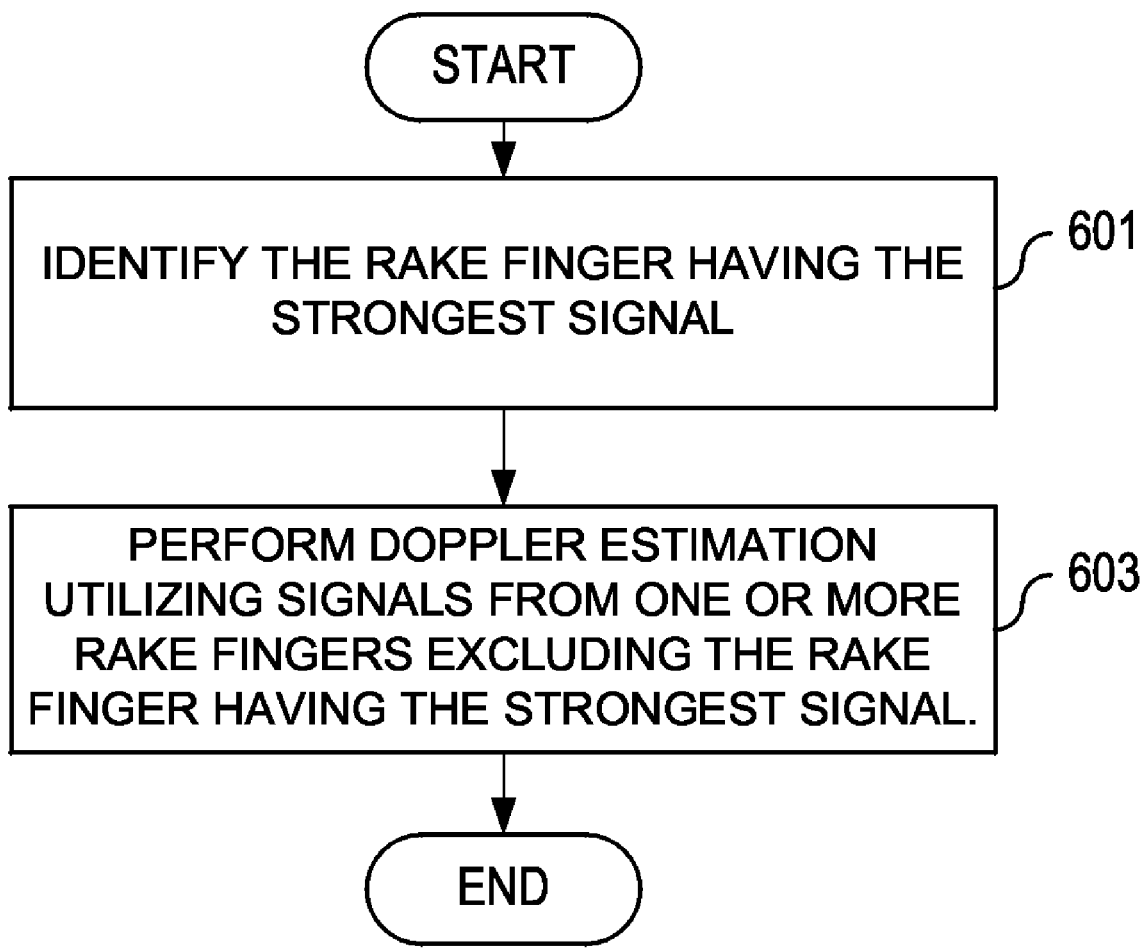
FIG. 6a is a flowchart of steps/processes performed in an exemplary embodiment that excludes signals from a strongest RAKE finger.

These and other aspects will now be described in even greater detail. FIG. 6a is a flowchart of steps/processes performed by logic in a UE in an exemplary embodiment that excludes signals from a strongest RAKE finger. The signals from the various fingers of the RAKE receiver in the UE are evaluated, and the finger generating the strongest signal is identified (step 601). Doppler estimation is then performed utilizing signals from one or more of the RAKE fingers excluding the RAKE finger identified as having the strongest signal (step 603). The Doppler estimation may be performed utilizing any of a number of techniques, such as but not limited to the level crossing algorithm and the argument crossing algorithm. In some embodiments, signals from only one RAKE finger are used, such as signals from the second strongest RAKE finger. In alternative embodiments, the number of crossings can be averaged over a number of RAKE fingers, with the signals from the strongest RAKE finger being excluded in the calculation.

Figure 2:
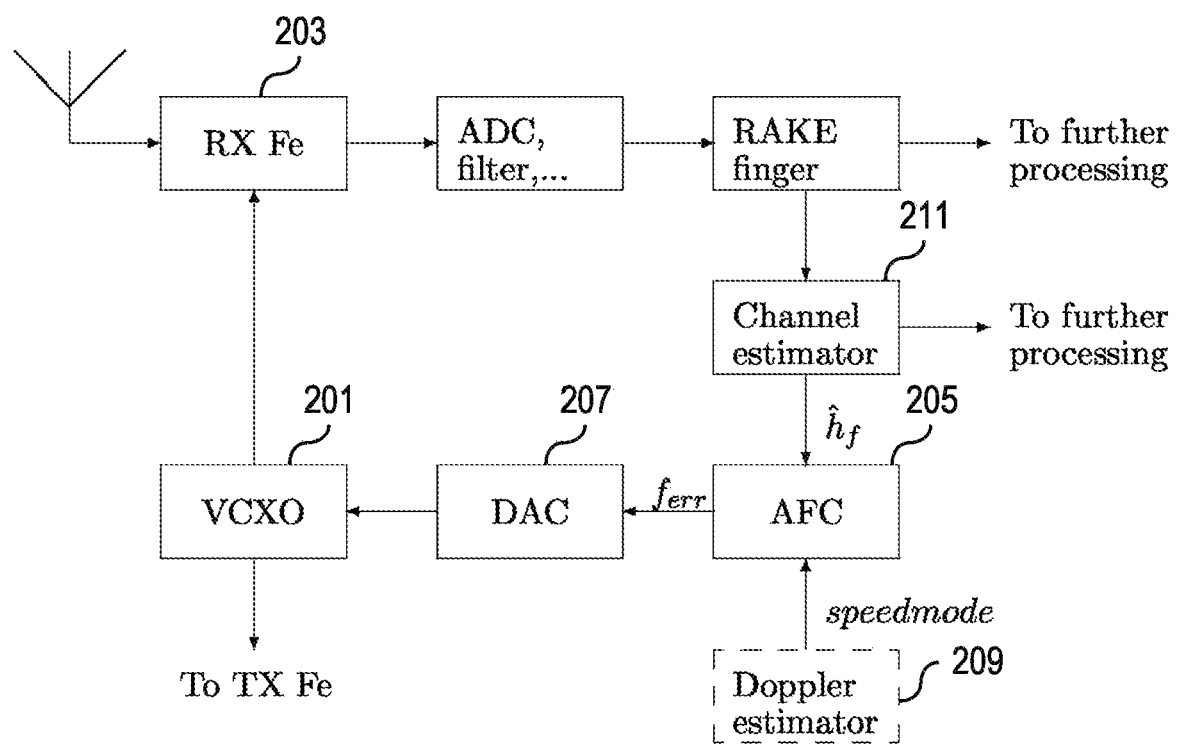
FIG. 2 is a block diagram of those parts of a UE involved in AFC operation.
Figure 3A:
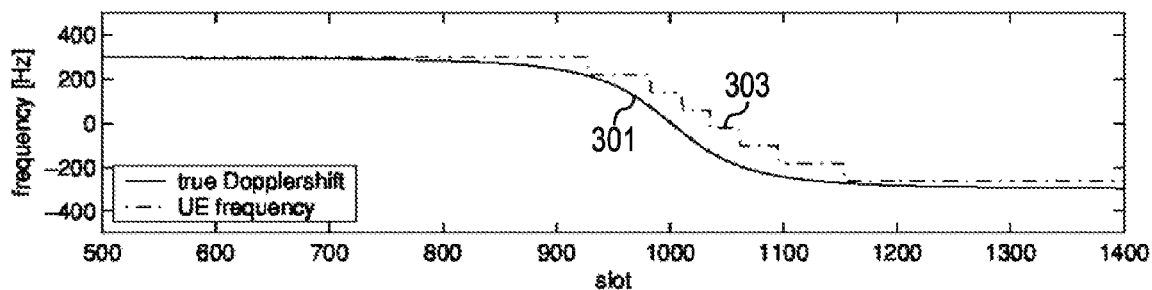
FIGS. 3a-c are graphs depicting the results of simulating the tracking ability of an AFC when it remains in a low speed mode of operation and the relative velocity between the simulated transmitter and receiver is relatively low (150 km/h).
Figure 3B:
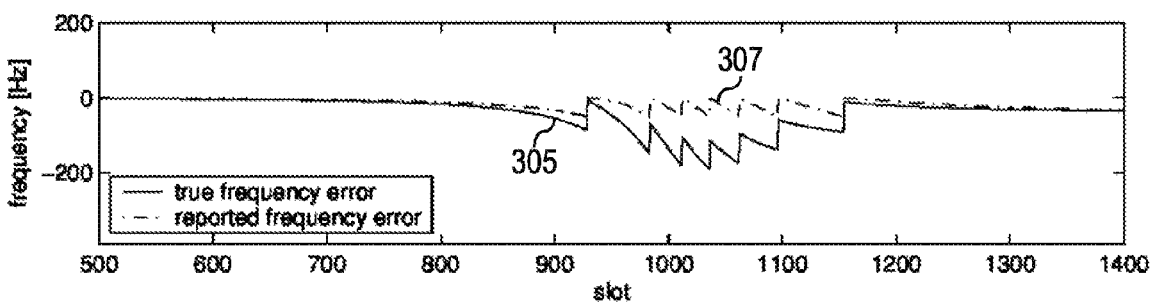
Figure 3C:
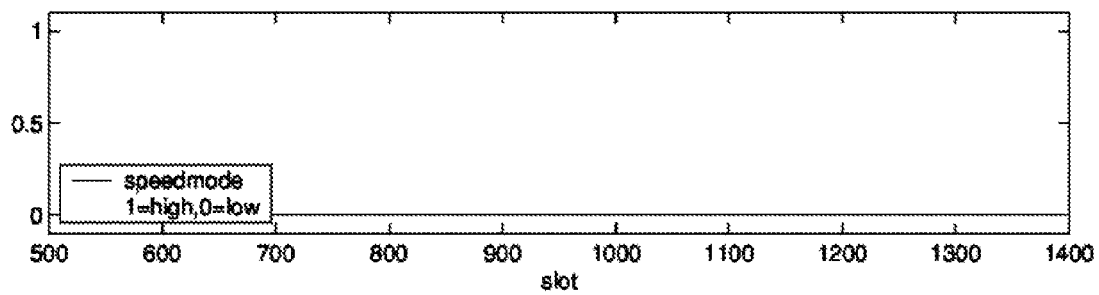
Figure 6B:
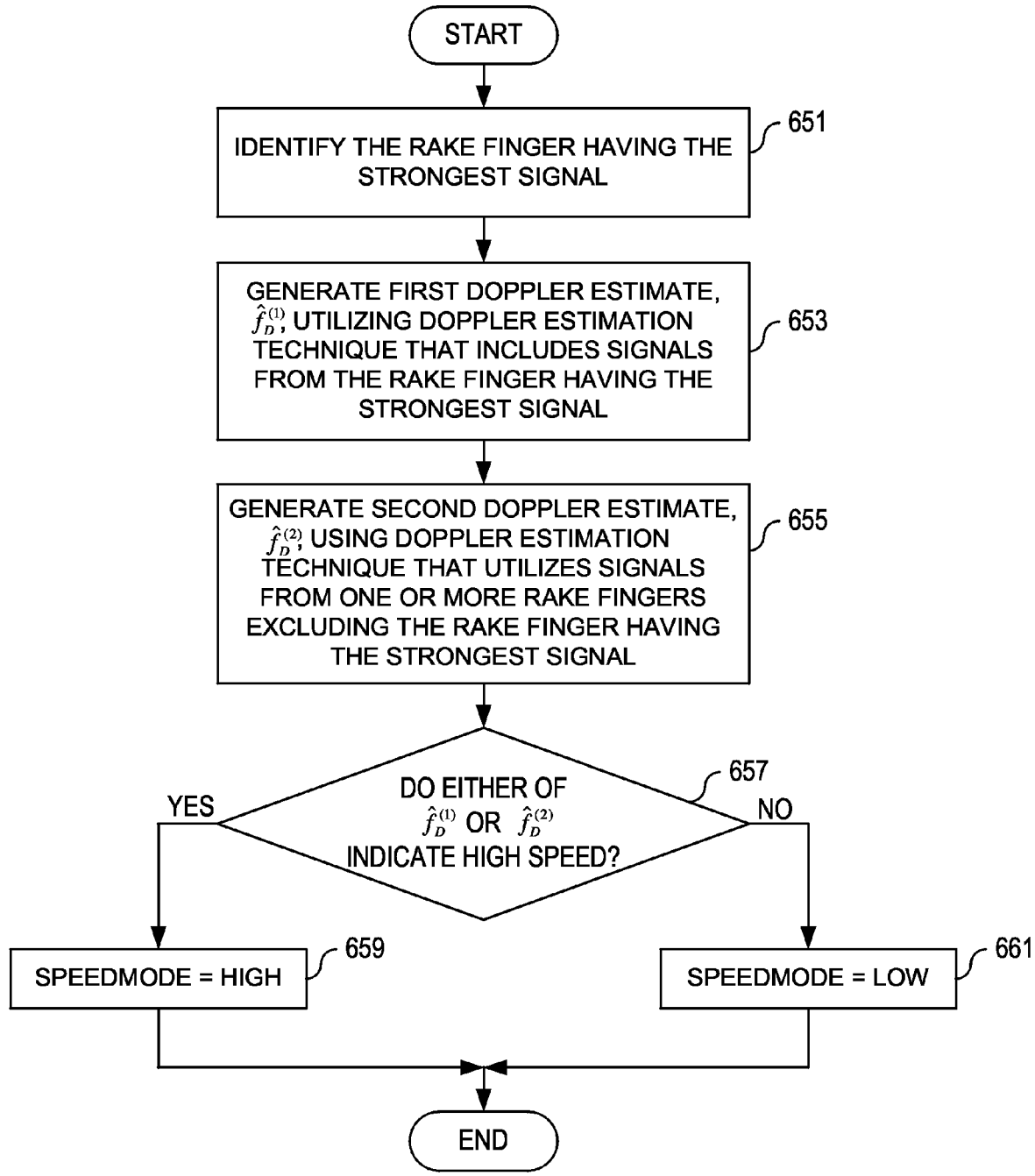
FIG. 6b is a flowchart of steps/processes performed in an alternative exemplary embodiment that excludes signals from a strongest RAKE finger to determine Doppler estimate for setting a speedmode parameter.

It is noted that the secondary paths (i.e., the one or more signal paths remaining after the strongest path has been excluded) may be much weaker than the strongest path, and in some situations too weak to give a useful Doppler estimate, $\hat{f}_D^{(2)}$. Such situations can cause unnecessary or ill-founded speedmode switching. Thus, in alternative embodiments, a plurality of Doppler estimates can be generated by different techniques, at least one of which excludes signals from the strongest RAKE finger as described above, and the results combined in a way that is useful to the particular application. For example, the speedmode parameter for controlling the AFC 205 in the UE of FIG. 2 can be determined by a Doppler estimator 209 performing steps such as the exemplary steps/processes illustrated in the flowchart of FIG. 6b. In one aspect, the signals from the various fingers of the RAKE receiver in the UE are evaluated, and the finger generating the strongest signal is identified (step 651). A first Doppler estimate, $\hat{f}_D^{(1)}$, is generated utilizing a Doppler estimation technique that includes signals from the RAKE finger identified as having the strongest signal (step 653). Additionally, a second Doppler estimate, $\hat{f}_D^{(2)}$, is generated by means of a Doppler estimation technique that utilizes signals from one or more of the RAKE fingers excluding the RAKE finger identified as having the strongest signal (step 655). In each case, any Doppler estimation technique can be used, such as but not limited to the level crossing algorithm and the argument crossing algorithm.

If either of the first and second Doppler estimates ($\hat{f}_D^{(1)}$ and $\hat{f}_D^{(2)}$) indicates relatively high speed between the receiver in the UE and the transmitter of the received signals ("YES" path out of decision block 657), then the speedmode parameter is set equal to "high speed" mode (step 659). Otherwise ("NO" path out of decision block 657), the speedmode parameter is set to a value indicating "low speed" mode (step 661).

Testing whether either of the first and second Doppler estimates ($\hat{f}_D^{(1)}$ and $\hat{f}_D^{(2)}$) indicates relatively high speed between the receiver in the UE and the transmitter of the received signals can be performed in any of a number of ways. In one exemplary embodiment, the testing and consequent setting of the speedmode parameter is done in accordance with $$speedmode(n) = \begin{cases} high & \text{if}\left(\hat{f}_D^{(1)}(n) > \tau_{high}\right) \text{ OR } \left(\left(\hat{f}_D^{(2)}(n) > \tau_{high}\right) \text{ AND } \left(r\left(\hat{f}_D^{(2)}(n)\right) > \tau_r\right)\right), \\ low & \text{if}\left(\hat{f}_D^{(1)}(n) < \tau_{low}\right) \text{ AND } \left(\left(\hat{f}_D^{(2)}(n) < \tau_{low}\right) \text{ OR } \left(r\left(\hat{f}_D^{(2)}(n)\right) < \tau_r\right)\right), \\ speedmode(n-1) & \text{otherwise,} \end{cases}$$

(5)

where $r(\hat{f}_D^{(2)}(n))$ is a parameter indicating the reliability of $\hat{f}_D^{(2)}(n)$, $\tau_{high}$ is a threshold representing the minimum Doppler value associated with high speed mode, $\tau_{low}$ is a threshold representing the maximum Doppler value associated with low speed mode, and $\tau_r$ is a threshold representing a minimum required value of reliability. The parameter $r(\hat{f}_D^{(2)}(n))$ can be defined in any of a number of ways, including but not limited to: a filtered SIR value of the second strongest finger, a power level of the second strongest finger, and an average SIR or power level value for all but the strongest fingers. The reliability threshold, $\tau_r$, can be an absolute (i.e., constant) threshold value, or may alternatively be determined dynamically, such as having it be a function of a filtered SIR value of the strongest finger.

The embodiments described above should be able to detect high relative velocity in all situations except LOS situations with no or very weak secondary paths. The situation in which the strongest path is not a LOS path, but is Rayleigh distributed should not have any negative impact on the method. The robustness to, for example, imperfect channel estimates should be the same as for standard Doppler estimators. The extra implementation cost is basically duplication of the Doppler estimator, and a slightly more complicated comparison (e.g., as in Equation (5)).

The discussion will now focus on other embodiments that include detection of phase rotation, and the use of such detection as an indicator of high relative velocity LOS situations. In a LOS situation, the envelope of the channel estimates for the strongest path will be fairly constant. Studying the phase variations, there is a phase rotation that is alternatively constant, increasing or decreasing, and this rotation is typically dominating over the random phase variations caused by fading. The rotation is constant, for example, when the UE is moving straight towards or away from a base station, and it is increasing or decreasing when the UE is, for example, passing a base station, accelerating, or warming up.

Hence, one criterion for detecting a LOS situation is to evaluate whether the angle between the channel estimates of the strongest path (with UE frequency reference updates taken into account) has the same sign over time, which means that the channel estimates are rotating.

Detecting uninterrupted rotation of the channel estimates indicates a LOS situation, but alone does not necessarily mean that the relative speed between the transmitter and receiver is high. Thus, an additional criterion is helpful to prevent low relative velocity LOS situations from triggering high speed mode AFC operation. For example, embodiments can be configured to permit high speed mode operation only if the rotation angle is greater than some threshold.

Figure 7:
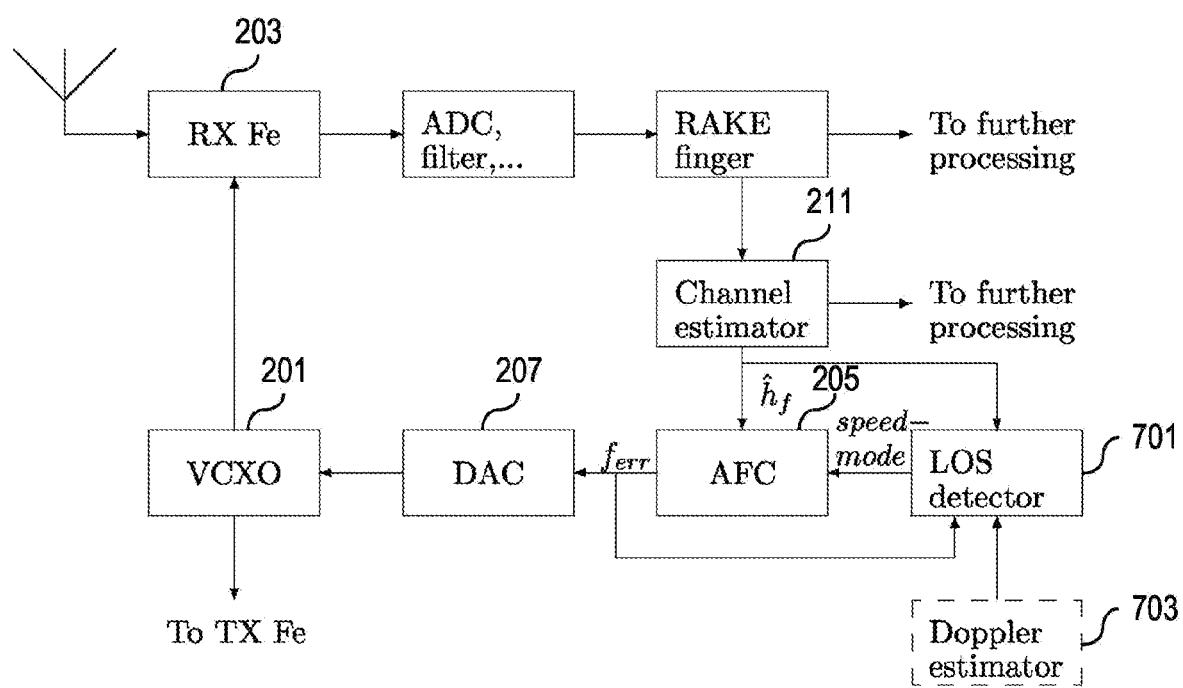
FIG. 7 is a block diagram of parts of a UE involved in AFC operation and LOS detection according to embodiments employing phase rotation as a LOS detector.

FIG. 7 is a block diagram of parts of a UE involved in AFC operation and LOS detection according to embodiments employing phase rotation as a LOS detector. The local oscillator (VCXO) 201 generates the frequencies necessary for operating the Front End Receiver (RX Fe) 203 and Front End Transmitter (not shown) sections. An AFC 205 generates a digital control signal ($f_{err}$) that, after conversion to analog by a Digital-to-Analog Converter (DAC) 207 adjusts the output frequency of the local oscillator 201.

Figure 8:
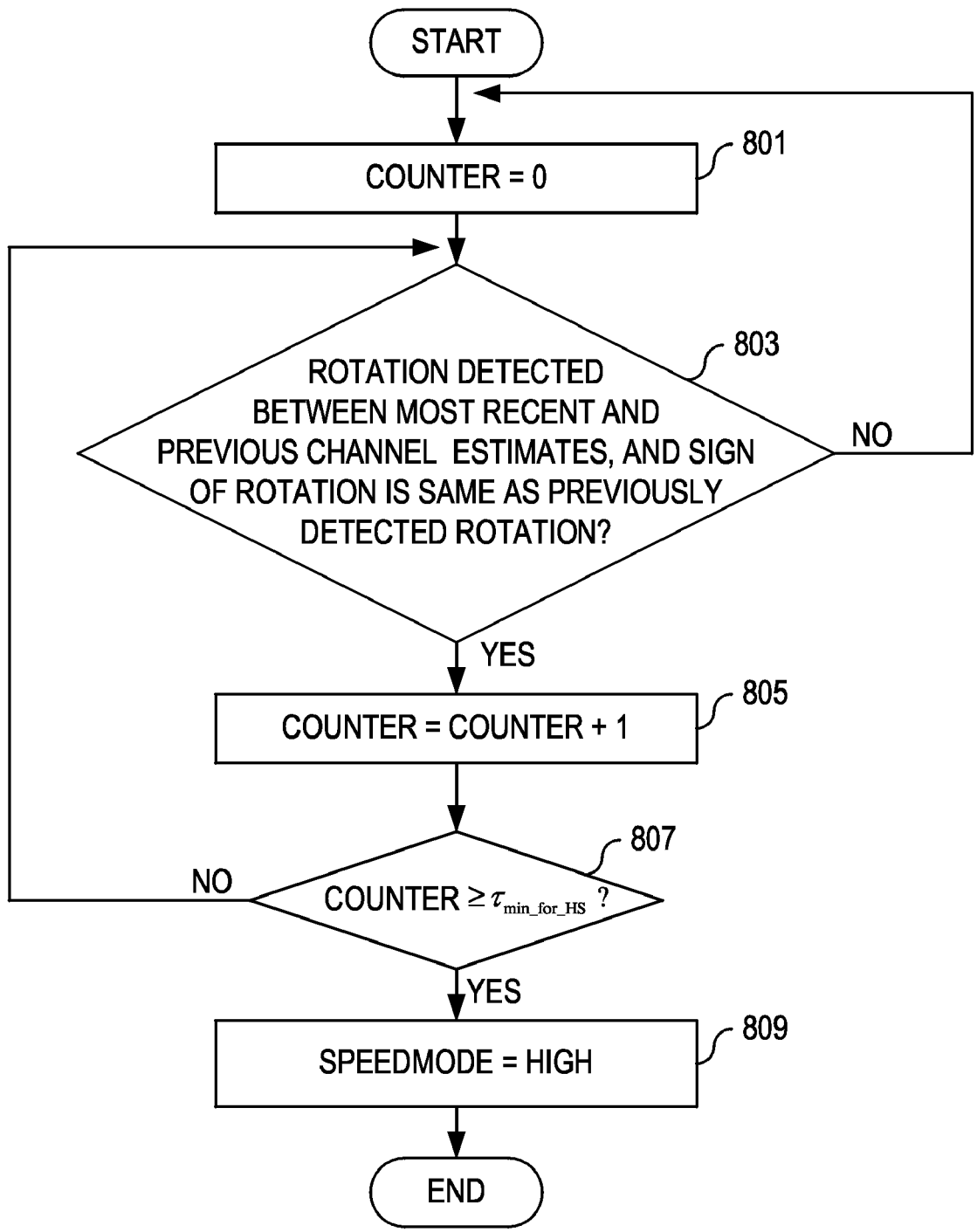
FIG. 8 is a flowchart depicting steps/processes performed by an exemplary LOS detector for determining whether to change operation of the AFC from low speed mode to high speed mode.

The UE further includes an LOS detector 701 that receives channel estimates, $\hat{h}_f$, from the channel estimator 211; and the frequency error signal, $f_{err}$, from the AFC 205. The LOS detector 701 generates the speedmode parameter for controlling the AFC 205. Exemplary operation of the LOS detector 701 is illustrated by the steps/processes depicted in the flowcharts of FIGS. 8 and 9. FIG. 8 is a flowchart depicting steps/processes for determining whether the UE's speedmode parameter should be changed from indicating a low speed mode to indicating a high speed mode of operation for the AFC 205. The strategy is to determine whether the channel estimates are experiencing a phase rotation for a predetermined period of time. In this exemplary embodiment, a counter is initialized to zero (step 801). Then logic in the UE determines whether a phase rotation has been detected between a most recent channel estimate and the previous channel estimate, and whether the rotation is of the same sign as previously detected rotation (decision block 803). If no phase rotation is detected ("NO" path out of decision block 803), the counter is reset to zero (step 801).

If a phase rotation is detected ("YES" path out of decision block 803), then the counter value is adjusted (e.g., by incrementing by "1") (step 805), and the resulting counter value is compared to a threshold value, $\tau_{min\_for\_HS}$, that corresponds to the predetermined minimum period of time that the phase rotation should be continuously detected before AFC operation should be changed from "low" to "high" speed mode (decision block 807). If the counter is greater than or equal to $\tau_{min\_for\_HS}$ ("YES" path out of decision block 807), then the speedmode parameter is set to indicate a "high" mode of operation (step 809). Otherwise ("NO" path out of decision block 807), the phase rotation has not been detected for a sufficient period of time, and testing continues back at decision block 803.

A particular implementation of the principles discussed above with respect to FIG. 8 can be in accordance with the following pseudocode:

```
if (sign (f_err,mom^tot (present)) == sign (f_err,mom^tot (previous)))
   AND (|f_err,mom (present)| > τ_1)
      Counter = Counter + 1;
else
      Counter = 0;
end
if Counter ≧ τ_min_for_HS
      speedmode = high
end
``` where $f_{err,mom}$ represents the momentary (i.e., non-filtered) frequency error of the strongest finger, $f_{err,mom}^{(tot)}$ represents the momentary (i.e., non-filtered) frequency error of the strongest finger with accumulated UE frequency reference updates, $\Delta f_{UE}^{(tot)}$, taken into account; that is, $f_{err,mom}^{(tot)} = f_{err,mom} - \Delta f_{UE}^{(tot)}$. Here, $f_{err,mom}$ depends on the rotation angle $$\varphi_{mom} = \arg\left(\hat{h}(\hat{h}^{(previous)})^*\right)$$

as $f_{err,mom} = \varphi_{mom}/2\pi\Delta t$, $\hat{h}$ and $\hat{h}^{(previous)}$ are the channel estimates for the strongest path for the current and previous slot respectively, and $\Delta t$ is the low-speed mode time interval between two consecutive updates of the AFC 205, for example $$\Delta t = \frac{1}{1500} s.$$

It is noted that the purpose of the test for $|f_{err,mom}(present)| > \tau_1$ in the first "if" statement in the above pseudocode is to permit entry into high speed mode only if the rotation angle is greater than a predetermined threshold.

In alternative embodiments, an extra condition can be added to the LOS detection, namely a comparison of the envelope of $\hat{h}$ to an upper and lower threshold to determine that there is little or no fading.

Figure 9:
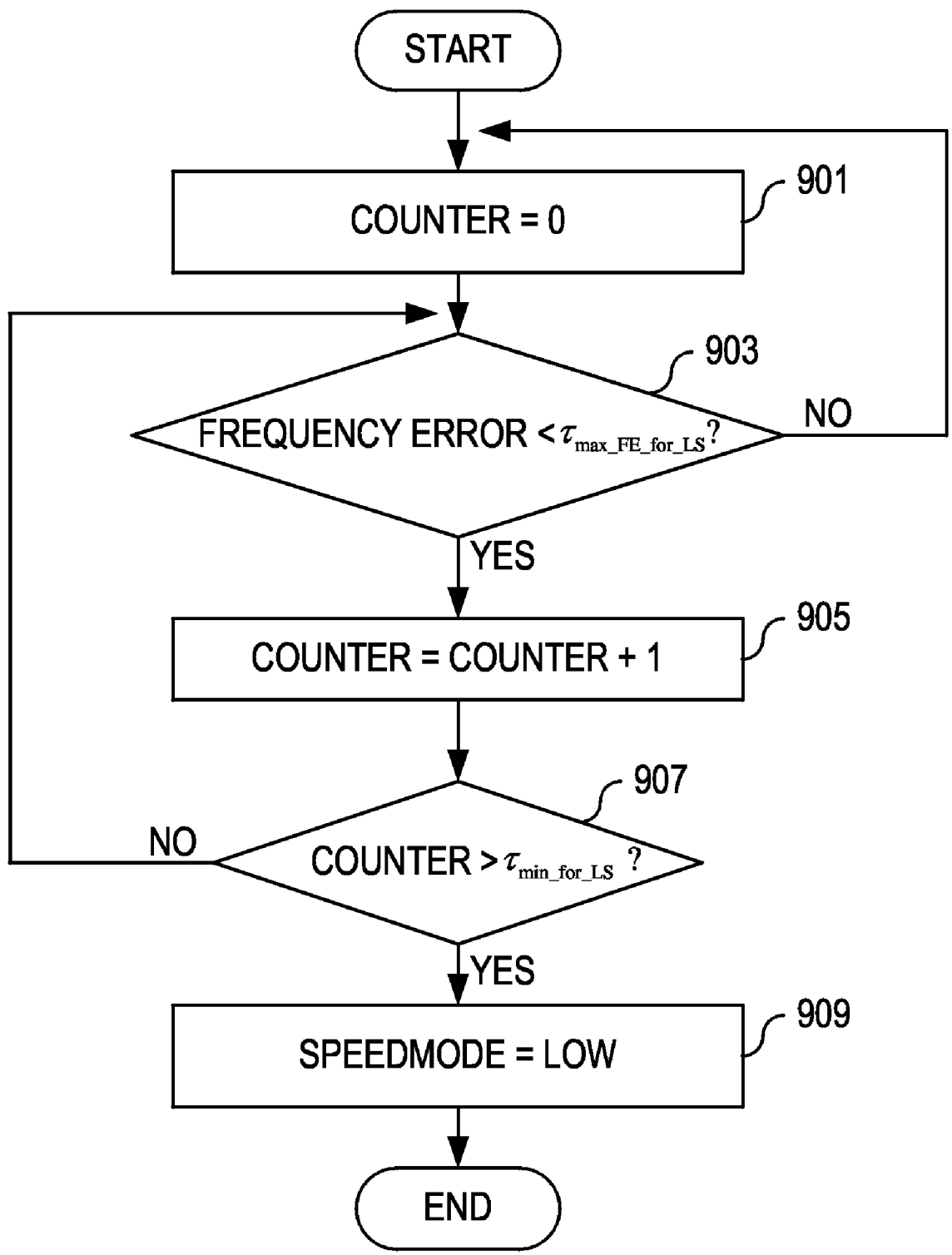
FIG. 9 is a flowchart depicting steps/processes performed by an exemplary LOS detector for determining whether to change operation of the AFC from high speed mode to low speed mode.

In another aspect, once it is operating in high speed mode, the UE may make a determination of when to return to low speed mode. FIG. 9 is a flowchart depicting steps/processes for determining whether the UE's speedmode parameter should be changed from indicating a high speed mode to indicating a low speed mode of operation for the AFC 205. The strategy is to determine when the magnitude of the frequency error generated by the AFC 205 has continuously remained below a threshold value, herein denoted $\tau_{max\_FE\_for\_LS}$, for a predetermined amount of time. This is to avoid changing operation of the AFC 205 back to low speed mode too quickly, which can cause aliasing problems to be encountered right away. Instead, operation of the AFC 205 is permitted to remain in high speed mode until it can be confirmed that the frequency error is no longer increasing. This indicates that the local oscillator (VCXO) 201 has assumed a correct value and that the Doppler shift is static.

Accordingly, in the exemplary embodiment of FIG. 9, a counter is initialized to zero (step 901). Next, the frequency error (generated by the AFC 205) is compared with a threshold value, $\tau_{max\_FE\_for\_LS}$ (decision block 903). If the frequency error is not less than the threshold value $\tau_{max\_FE\_for\_LS}$ ("NO" path out of decision block 903), the counter is reset to zero (step 901) and testing continues.

If the frequency error is less than the threshold value $\tau_{max\_FE\_for\_LS}$ ("YES" path out of decision block 903), then the counter value is adjusted (e.g., by incrementing by "1") (step 905). The adjusted counter value is then compared with a threshold value, $\tau_{min\_for\_LS}$, that corresponds to a predetermined period of time that the frequency error should continuously be found to be less than the threshold value $\tau_{max\_FE\_for\_LS}$ in order to go back to low speed mode (decision block 907). If the adjusted counter value is not greater than the threshold value $\tau_{min\_for\_LS}$ ("NO" path out of decision block 907), testing is repeated, starting back at decision block 903.

However, if the adjusted counter value is greater than the threshold value $\tau_{min\_for\_LS}$ ("YES" path out of decision block 907), then the speedmode parameter is set to indicate low speed mode (step 909).

A particular implementation of the principles discussed above with respect to FIG. 9 can be in accordance with the following pseudocode:

```
if (|f_err| < τ_max_FE_for_LS )
      Counter = Counter + 1;
else
      Counter = 0;
end
if Counter ≧ τ_min_for_LS
      speedmode = low;
end
```

In another aspect, embodiments are able to have proper speed mode operation when the strongest path is fading by combining the algorithm described with reference to FIGS. 8 and 9 with results generated by, for example, Doppler estimation techniques, such as those described earlier. Combination can be achieved in a logical OR fashion (i.e., if at least one of the LOS detection and the Doppler estimation results indicates high speed mode, then the AFC 205 should be operated in high speed mode, and the AFC 205 should be operated in low speed mode if and only if both of the LOS detection and the Doppler estimation results indicate low speed mode). This arrangement is illustrated in FIG. 7 by the inclusion of a Doppler estimator 703 (depicted in dashed lines to indicate that it is an optional element), which provides its results to the LOS detector 701. The Doppler estimator 703 can, for example, operate as discussed above with respect to FIG. 6a or 6b, or in accordance any other Doppler estimation techniques, including conventional techniques.

Simulations of the LOS detection techniques described above with respect to FIGS. 8 and 9 were performed, and the results depicted in FIGS. 10-11. Doppler estimates are not used in the speedmode setting in any of the simulations. The thresholds were set as follows:

$\tau_1$=60 Hz;
$\tau_{min\_for\_HS}$=16 counts (=16 slots in low speed mode);
$\tau_{max\_FE\_for\_LS}$=50 Hz; and
$\tau_{min\_for\_LS}$=64 counts (=64/5 slots in high speed mode).

Figure 4A:
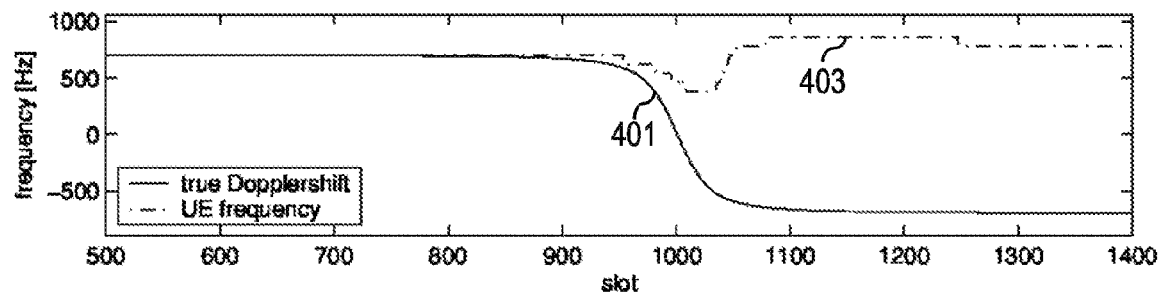
FIGS. 4a-c are graphs depicting the tracking ability of the AFC when it remains in a low speed mode of operation but the relative velocity increases to 350 km/h.
Figure 4B:
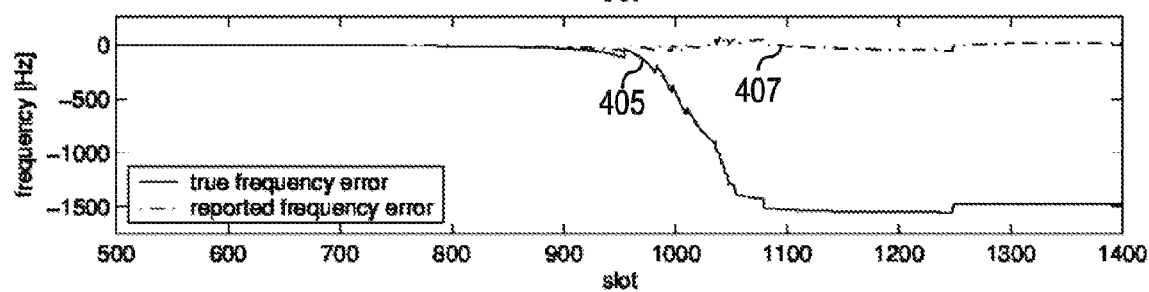
Figure 4C:
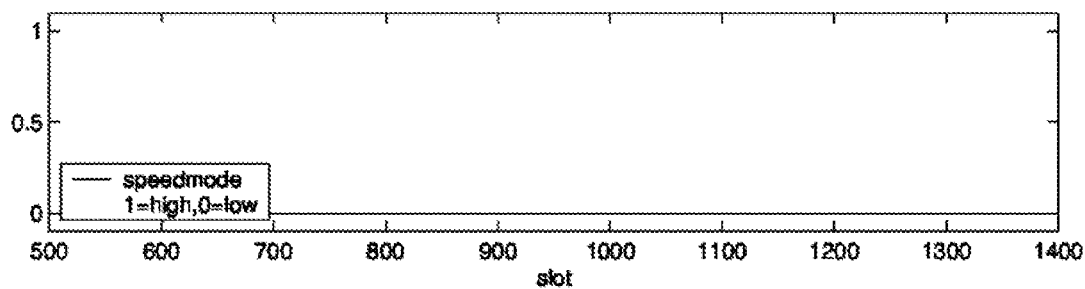
Figure 5A:
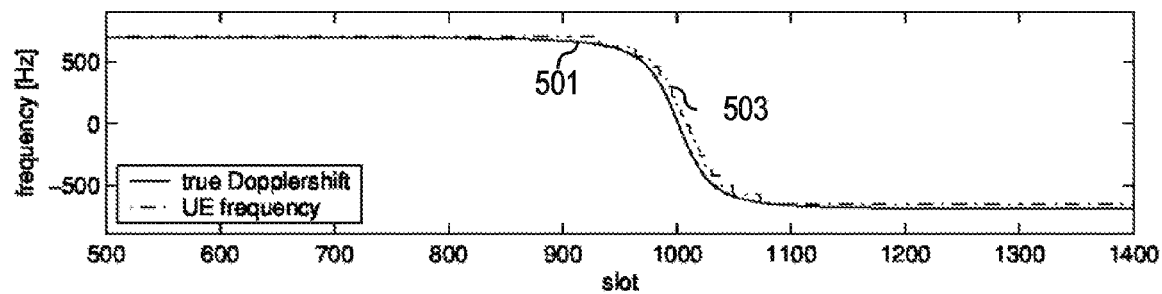
FIGS. 5a-c are graphs depicting the tracking ability of the AFC when it operates at a high speed mode and the relative velocity is 350 km/h.
Figure 5B:
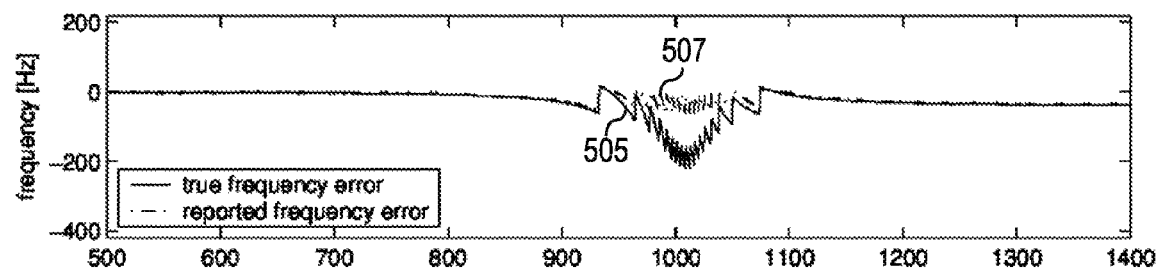
Figure 5C:
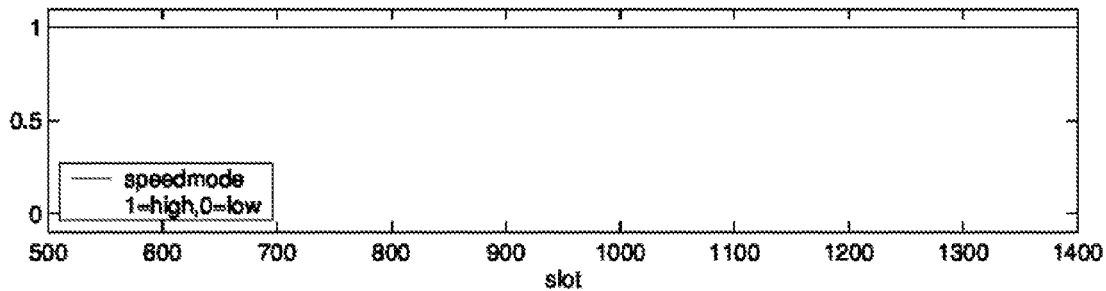
Figure 10A:
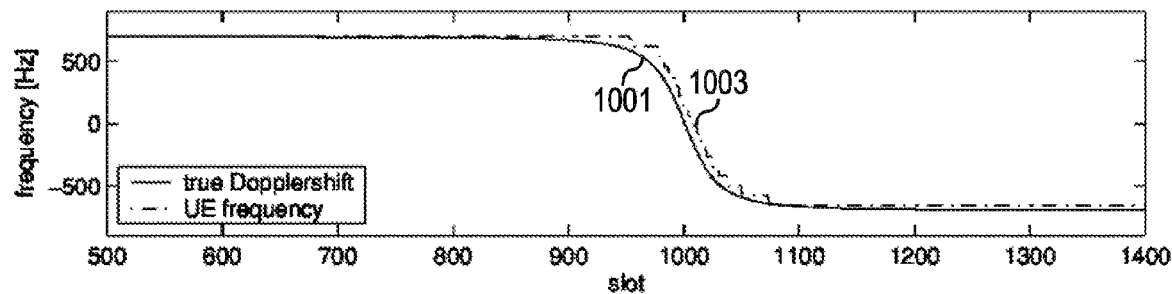
FIGS. 10a-c are graphs depicting the tracking ability of an AFC when the speedmode parameter is controlled in accordance with herein-described LOS detection techniques and the relative velocity between transmitter and receiver is 350 km/h.
Figure 10B:
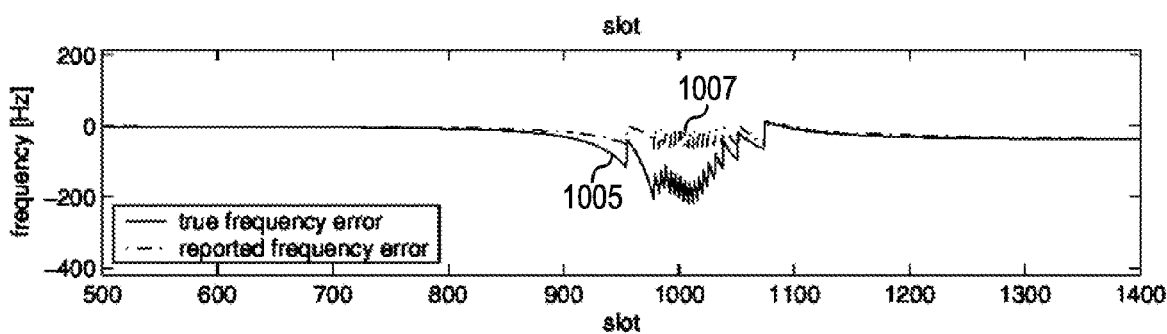
Figure 10C:
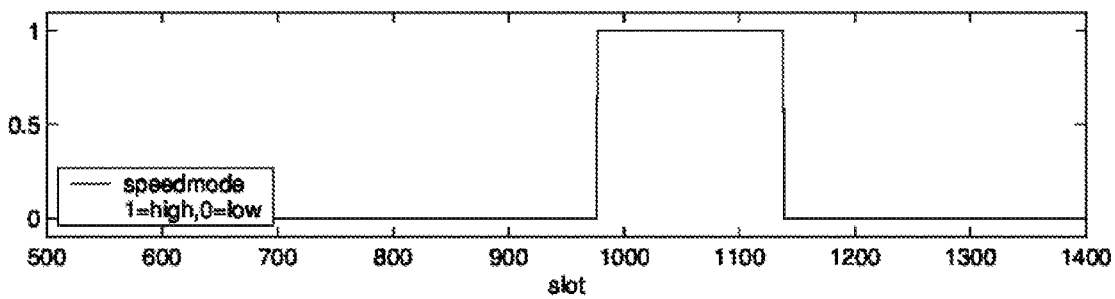

FIGS. 10a-c are graphs depicting the tracking ability of the AFC 205 when the speedmode parameter is controlled in accordance with the above-described LOS detection techniques and the relative velocity between transmitter and receiver is 350 km/h under the scenario conditions described earlier. FIG. 10a allows a comparison to be made between the true Doppler shift (graph 1001) and the shift in the UE frequency (graph 1003). FIG. 10b allows a comparison to be made between the true frequency error (graph 1005) and the reported frequency error (graph 1007) generated by the AFC 205. A large frequency change occurs over the interval spanning approximately slot 925 through slot 1075. As can be seen from FIG. 10c, the above-described LOS detection techniques cause the AFC 205 to switch to high speed operation during the interval spanning approximately slot 975 through slot 1140. As a result, the AFC 205 is able to successfully track the frequency change (compare with FIG. 4).

Figure 11A:
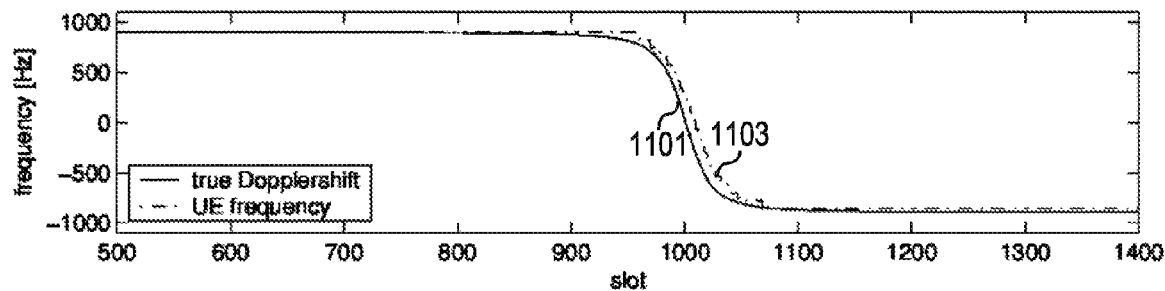
FIGS. 11a-c are graphs depicting the tracking ability of an AFC when the speedmode parameter is controlled in accordance with herein-described LOS detection techniques and the relative velocity between transmitter and receiver is 450 km/h.
Figure 11B:
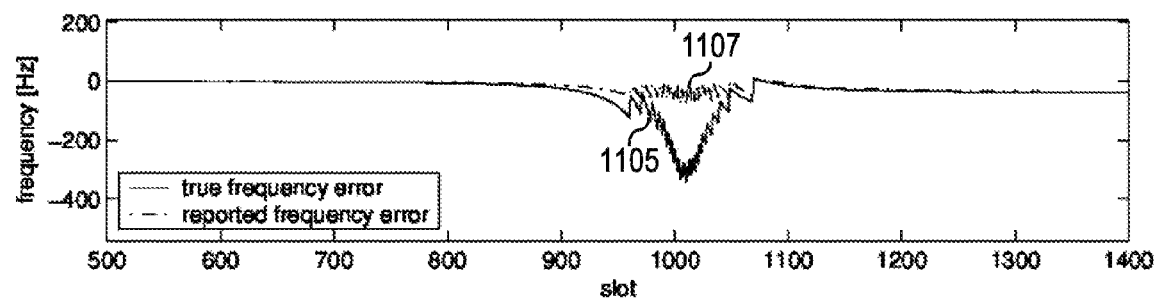
Figure 11C:
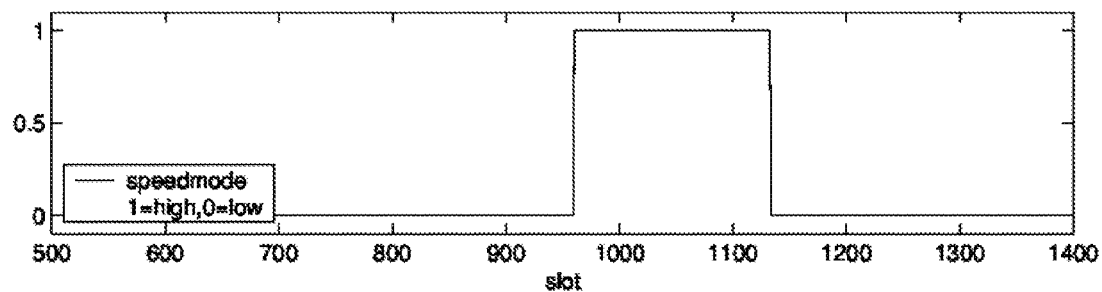

FIGS. 11a-c are graphs depicting the tracking ability of the AFC 205 when the speedmode parameter is controlled in accordance with the above-described LOS detection techniques and the relative velocity between transmitter and receiver is 450 km/h under scenario 1 conditions. FIG. 11a allows a comparison to be made between the true Doppler shift (graph 1101) and the shift in the UE frequency (graph 1103). FIG. 11b allows a comparison to be made between the true frequency error (graph 1105) and the reported frequency error (graph 1107) generated by the AFC 205. A large frequency change occurs over the interval spanning approximately slot 925 through slot 1075. As can be seen from FIG. 11c, the above-described LOS detection techniques cause the AFC 205 to switch to high speed operation during the interval spanning approximately slot 960 through slot 1130. As a result, the AFC 205 is able to successfully track the frequency change.

Alternative embodiments could involve trying to detect LOS situations only when the Doppler shift is gradually changing. This can be accomplished by evaluating whether the angle between the channel estimates of the strongest path (with UE frequency reference updates taken into account) is increasing or decreasing gradually.

In another aspect, when the received signal comprises several multipath components and/or signals from multiple cells (e.g., as occurs in soft handover), several RAKE fingers are then involved in AFC operation, and in such cases a typical AFC reports a frequency error, $f_{err}$, that is a weighted combination of the frequency errors of the respective fingers of the RAKE receiver. Other combinations of the fingers' frequency errors are possible. For example, one might use a non-weighted combination, the median value, or simply the frequency error of the strongest finger. The reported frequency error could even be equal to that of one of the cells in soft handover, for example, the HSDPA serving cell when applicable. In any case, the AFC will report a single frequency error, which is used to set the frequency of the local oscillator 201. This frequency is herein denoted the AFC frequency, and the remaining frequency error per finger (i.e., the difference between the frequency of the respective finger and the AFC frequency) is herein referred to as the residual frequency offset per finger, $f_{err,f}^{(res)}$, where f denotes a particular one of the fingers in the RAKE receiver.

Knowledge about the residual frequency offsets of the respective fingers can be used to improve UE receiver performance in high relative velocity scenarios. That is, a function of $f_{err,f}^{(res)}$, f∈F (where F represents the set of fingers involved in AFC operation) may be used as a switch to turn on and off receiver algorithms, or it may be used to set parameters in receiver algorithms such as the speedmode for AFC. The function may be, for example, $$\zeta(f_{err,f}^{(res)}) = \max_{f \in F} f_{err,f}^{(res)}. \qquad (6)$$

Alternatively, the function could be $$\zeta(f_{err,f}^{(res)}) = \frac{1}{|F|} \sum_{f \in F} f_{err,f}^{(res)}, \qquad (7)$$

among others.

It is noted that $\zeta(f_{err,f}^{(res)})$ may be interpreted as a form of relative velocity estimate, since large residual frequency offset values only occur in high relative velocity situations. It is further noted, however, that high values of $\zeta(f_{err,f}^{(res)})$ may not be seen in all high relative velocity situations, such as in a single cell LOS situation.

Thus, in alternative embodiments, the function $\zeta(f_{err,f}^{(res)})$ may be used as a supplementary relative velocity estimate, with high speed being indicated when $\zeta(f_{err,f}^{(res)})$ is greater than a predefined threshold value. The results of this test can then be combined (e.g., in an OR fashion) with a Doppler estimate, and/or possibly with one or two of the various supplementary methods described earlier. When at least one of the Doppler estimator, the detection algorithms described earlier, and $\zeta(f_{err,f}^{(res)})$ indicates high speed, the UE should engage into high speed mode operation, and low speed mode should only be applied if all algorithms indicate low speed.

The invention has been described with reference to particular embodiments. However, it will be readily apparent to those skilled in the art that it is possible to embody the invention in specific forms other than those of the embodiment described above.

For example, the exemplary embodiments focus on downlink reception at the UE. However, the various aspects described herein are equally applicable to uplink reception by a base station.

Additionally, the various embodiments have been described in the context of cellular telecommunications. However, the invention is not limited to such embodiments, but rather can be applied in other types of communications systems, such as but not limited to Wireless Local Area Network (WLAN) and Personal Are Network (PAN) systems using, for example, Bluetooth® technology. In such embodiments, it will be recognized that the relative velocity detected represents the combined affect of movement between the several communicating devices.

Furthermore, the various embodiments illustrate situations in which relative velocities are assumed to be characterized by one of two states, for example, "high" and "low." However, the invention is useful for detecting whether a relative velocity between a transmitter and a receiver is higher than a predetermined threshold. Thus, in some embodiments, several threshold values can be defined, which in turn define more than two states of relative velocity. For example, defining two thresholds can enable relative velocity to be characterized as "low", "medium", and "high." Those of ordinary skill in the art will readily be able to adapt the teachings above to embodiments that test against several possible threshold values, so that the relative velocity can be characterized with higher resolution.

Thus, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of detecting that a relative velocity between a transmitter and a receiver in a telecommunications system is higher than a predetermined amount, the method comprising:
    using a Doppler estimation technique to generate an estimate of Doppler spread, $\hat{f}_D^{(1)}$, based on a received signal;
    using an alternative velocity estimation technique to generate an estimate of velocity, $\hat{v}$, based on the received signal, wherein the alternative velocity estimation technique differs from the Doppler estimation technique; and
    using a plurality of estimates to detect whether the relative velocity between the transmitter and the receiver is higher than the predetermined amount, wherein the plurality of estimates includes at least the estimate of Doppler spread and the estimate of velocity.

2. The method of claim 1, wherein:
    the Doppler estimation technique is a first Doppler estimation technique;
    the estimate of Doppler spread, $\hat{f}_D^{(1)}$, is a first estimate of Doppler spread;
    the alternative velocity estimation technique is a second Doppler estimation technique that differs from the first Doppler estimation technique; and
    the estimate of velocity is a second estimate of Doppler spread, $\hat{f}_D^{(2)}$.

3. The method of claim 2, wherein:
    the first Doppler estimation technique comprises utilizing information about a part of the received signal associated with a strongest path between the transmitter and the receiver; and
    the second Doppler estimation technique comprises:
        excluding information about a part of the received signal associated with the strongest path between the transmitter and the receiver; and
        utilizing information about a part of the received signal associated with a secondary path between the transmitter and the receiver.

4. The method of claim 3, wherein using the plurality of estimates to detect whether a relative velocity between the transmitter and the receiver is higher than the predetermined amount comprises:

concluding that the relative velocity between the transmitter and the receiver is higher than the predetermined amount if $(\hat{f}_D^{(1)} > \tau_{high}) \text{OR}((\hat{f}_D^{(2)} > \tau_{high}) \text{AND}(r(f_D^{(2)}) > \tau_r))$; and concluding that the relative velocity between the transmitter and the receiver is lower than the predetermined amount if $(\hat{f}_D^{(1)} < \tau_{low}) \text{AND}((\hat{f}_D^{(2)} < \tau_{low}) \text{OR}(r(f_D^{(2)}) < \tau_r))$, wherein $r(\hat{f}_D^{(2)})$ is a parameter indicating the reliability of $\hat{f}_D^{(2)}$, $\tau_{high}$ is a threshold representing a minimum Doppler value associated with a relative velocity between the transmitter and the receiver that is higher than the predetermined amount, $\tau_{low}$ is a threshold representing a maximum Doppler value associated with a relative velocity between the transmitter and the receiver that is lower than the predetermined amount, and $\tau_r$ is a threshold representing a minimum required value of reliability.

5. The method of claim 2, comprising:
    detecting whether there exists uninterrupted rotation of a channel estimate over a predetermined period of time; and
    in response to detecting the existence of uninterrupted rotation of the channel estimate over the predetermined period of time, concluding that the relative velocity between the transmitter and the receiver is higher than the predetermined amount.

6. The method of claim 5, comprising:
    in response to detecting that the relative velocity between the transmitter and the receiver is higher than the predetermined amount, operating an automatic frequency controller at a high update rate; and
    changing operation of the automatic frequency controller to a low update rate in response to determining that a magnitude of a frequency error generated by the automatic frequency controller has continuously remained below a predetermined threshold value for a predetermined period of time.

7. The method of claim 2, comprising:
    determining a residual frequency offset value, $f_{err,f}^{(res)}$, f∈F, wherein F represents a set of RAKE receiver fingers involved in automatic frequency control operation;
    determining a function of the residual frequency offset value, $\zeta(f_{err,f}^{(res)})$; and
    concluding that the relative velocity between the transmitter and the receiver is higher than the predetermined amount in response to determining that the function of the residual frequency offset value, $\zeta(f_{err,f}^{(res)})$, is greater than a predetermined threshold value.

8. The method of claim 1, wherein using the plurality of estimates comprises concluding that the relative velocity between the transmitter and the receiver is not higher than the predetermined amount only if none of the plurality of estimates indicates that the relative velocity between the transmitter and the receiver is higher than the predetermined amount.

9. The method of claim 1, wherein the alternative velocity estimation technique comprises:
    detecting whether there exists uninterrupted rotation of a channel estimate over a predetermined period of time; and
    in response to detecting the existence of uninterrupted rotation of the channel estimate over the predetermined period of time, concluding that the relative velocity between the transmitter and the receiver is higher than the predetermined amount.

10. The method of claim 1, wherein the alternative velocity estimation technique comprises:
determining a residual frequency offset value, $f_{err,f}^{(res)}$, f∈F, wherein F represents a set of RAKE receiver fingers involved in automatic frequency control operation;
determining a function of the residual frequency offset value, $\zeta(f_{err,f}^{(res)})$; and
concluding that the relative velocity between the transmitter and the receiver is higher than the predetermined amount in response to determining that the function of the residual frequency offset value, $\zeta(f_{err,f}^{(res)})$, is greater than a predetermined threshold value.

11. The method of claim 10, wherein:

$$\zeta(f_{err,f}^{(res)}) = \max_{f \in F} f_{err,f}^{(res)}.$$

12. The method of claim 10, wherein:

$$\zeta(f_{err,f}^{(res)}) = \frac{1}{|F|} \sum_{f \in F} f_{err,f}^{(res)}.$$

13. The method of claim 1, comprising:
setting receiver parameters based on whether the relative velocity between the transmitter and the receiver is detected to be higher than the predetermined amount.

14. The method of claim 1, comprising:
setting automatic frequency control parameters based on whether the relative velocity between the transmitter and the receiver is detected to be higher than the predetermined amount.

15. The method of claim 1, wherein the method is performed in a user equipment.

16. The method of claim 1, wherein the method is performed in a base station of the telecommunication system.

17. The method of claim 1, wherein:
the telecommunication system is a Wideband Code Division Multiple Access (WCDMA) telecommunications system; and
the method is performed in a device associated with the WCDMA telecommunications system.

18. An apparatus for detecting that a relative velocity between a transmitter and a receiver in a telecommunications system is higher than a predetermined amount, the apparatus comprising:
a Doppler estimator that generates an estimate of Doppler spread, $\hat{f}_D^{(1)}$, based on a received signal;
an alternative velocity estimator that generates an estimate of velocity, $\hat{v}$, based on the received signal; and
logic that uses a plurality of estimates to detect whether the relative velocity between the transmitter and the receiver is higher than the predetermined amount, wherein:
the plurality of estimates includes at least the estimate of Doppler spread and the estimate of velocity;
the Doppler estimator uses a Doppler estimation technique;
the alternative velocity estimator uses an alternative velocity estimation technique; and
the Doppler estimation technique differs from the alternative velocity estimation technique.

19. The apparatus of claim 18, wherein:
the Doppler estimation technique is a first Doppler estimation technique;
the estimate of Doppler spread, $\hat{f}_D^{(1)}$, is a first estimate of Doppler spread;
the alternative velocity estimation technique is a second Doppler estimation technique that differs from the first Doppler estimation technique; and
the estimate of velocity is a second estimate of Doppler spread, $\hat{f}_D^{(2)}$.

20. The apparatus of claim 19, wherein:
the first Doppler estimator comprises logic that utilizes information about a part of the received signal associated with a strongest path between the transmitter and the receiver; and
the second Doppler estimation technique comprises:
excluding information about a part of the received signal associated with the strongest path between the transmitter and the receiver; and
utilizing information about a part of the received signal associated with a secondary path between the transmitter and the receiver.

21. The apparatus of claim 20, wherein the logic that uses the plurality of estimates to detect whether a relative velocity between the transmitter and the receiver is higher than the predetermined amount comprises:
logic that concludes that the relative velocity between the transmitter and the receiver is higher than the predetermined amount if $(\hat{f}_D^{(1)} > \tau_{high})$OR$((\hat{f}_D^{(2)} > \tau_{high})$AND$(r(\hat{f}_D^{(2)}) > \tau_r))$; and logic that concludes that the relative velocity between the transmitter and the receiver is not higher than the predetermined amount if $(\hat{f}_D^{(1)} < \tau_{low})$AND$((\hat{f}_D^{(2)} < \tau_{low})$OR$(r(\hat{f}_D^{(2)}) < \tau_r))$, wherein $r(\hat{f}_D^{(2)})$ is a parameter indicating the reliability of $\hat{f}_D^{(2)}$, $\tau_{high}$ is a threshold representing a minimum Doppler value associated with relative velocity between the transmitter and the receiver that is higher than the predetermined amount, $\tau_{low}$ is a threshold representing a maximum Doppler value associated with a relative velocity between the transmitter and the receiver that is lower than the predetermined amount, and $\tau_r$ is a threshold representing a minimum required value of reliability.

22. The apparatus of claim 19, comprising:
logic that detects whether there exists uninterrupted rotation of a channel estimate over a predetermined period of time; and
logic that, in response to detecting the existence of uninterrupted rotation of the channel estimate over the predetermined period of time, concludes that the relative velocity between the transmitter and the receiver is higher than the predetermined amount.

23. The apparatus of claim 22, comprising:
logic that, in response to detecting that the relative velocity between the transmitter and the receiver is higher than the predetermined amount, operates an automatic frequency controller at a high update rate; and
logic that changes operation of the automatic frequency controller to a low update rate in response to determining that a magnitude of a frequency error generated by the automatic frequency controller has continuously remained below a predetermined threshold value for a predetermined period of time.

24. The apparatus of claim 19, comprising:
- logic that determines a residual frequency offset value, $f_{err,f}^{(res)}$, f∈F, wherein F represents a set of RAKE receiver fingers involved in automatic frequency control operation;
- logic that determines a function of the residual frequency offset value, $\zeta(f_{err,f}^{(res)})$; and
- logic that concludes that the relative velocity between the transmitter and the receiver is higher than the predetermined amount in response to determining that the function of the residual frequency offset value, $\zeta(f_{err,f}^{(res)})$, is greater than a predetermined threshold value.

25. The apparatus of claim 18, wherein the logic that uses the plurality of estimates comprises logic that concludes that the relative velocity between the transmitter and the receiver is not higher than the predetermined amount only if none of the plurality of estimates indicates that the relative velocity between the transmitter and the receiver is higher than the predetermined amount.

26. The apparatus of claim 18, wherein the alternative velocity estimator comprises:
- logic that detects whether there exists uninterrupted rotation of a channel estimate over a predetermined period of time; and
- logic that, in response to detecting the existence of uninterrupted rotation of the channel estimate over the predetermined period of time, concludes that the relative velocity between the transmitter and the receiver is higher than the predetermined amount.

27. The apparatus of claim 18, wherein the alternative velocity estimator comprises:
- logic that determines a residual frequency offset value, $f_{err,f}^{(res)}$, f∈F, wherein F represents a set of RAKE receiver fingers involved in automatic frequency control operation;
- logic that determines a function of the residual frequency offset value, $\zeta(f_{err,f}^{(res)})$; and
- logic that concludes that the relative velocity between the transmitter and the receiver is higher than the predetermined amount in response to determining that the function of the residual frequency offset value, $\zeta(f_{err,f}^{(res)})$, is greater than a predetermined threshold value.

28. The apparatus of claim 27, wherein:

$$\zeta(f_{err,f}^{(res)}) = \max_{f \in F} f_{err,f}^{(res)}.$$

29. The apparatus of claim 27, wherein:

$$\zeta(f_{err,f}^{(res)}) = \frac{1}{|F|} \sum_{f \in F} f_{err,f}^{(res)}.$$

30. The apparatus of claim 18, comprising:
- logic that sets receiver parameters based on whether the relative velocity between the transmitter and the receiver is detected to be higher than the predetermined amount.

31. The apparatus of claim 18, comprising:
- logic that sets automatic frequency control parameters based on whether the relative velocity between the transmitter and the receiver is detected to be higher than the predetermined amount.

32. The apparatus of claim 18, wherein the apparatus is part of a user equipment.

33. The apparatus of claim 18, wherein the apparatus is part of a base station of the telecommunication system.

34. The apparatus of claim 18, wherein:
- the telecommunication system is a Wideband Code Division Multiple Access (WCDMA) telecommunications system; and
- the apparatus is part of a device associated with the WCDMA telecommunications system.

* * * * *

UNITED STATES PATENT AND TRADEMARK OFFICE
CERTIFICATE OF CORRECTION

PATENT NO. : 7,647,049 B2  Page 1 of 1
APPLICATION NO. : 11/456998
DATED : January 12, 2010
INVENTOR(S) : Engdahl et al.

It is certified that error appears in the above-identified patent and that said Letters Patent is hereby corrected as shown below:

On the Title Page, in item (56), under "OTHER PUBLICATIONS", insert missing entry
-- U.S. Patent Application No. 11/457,029, inventor Karin Engdahl --.

On the Title Page, in item (56), under "OTHER PUBLICATIONS", insert missing entry
-- U.S. Patent Application No. 11/457,018, inventor Karin Engdahl --.

On Page 2, item (56), under "FOREIGN PATENT DOCUMENTS", in Column 1, Line 6, delete "JP  2001-298395  A  10/2001".

Signed and Sealed this

Sixth Day of July, 2010

David J. Kappos
*Director of the United States Patent and Trademark Office*